United States Patent [19]

Doveinis

[11] 4,069,616
[45] Jan. 24, 1978

[54] WINDOW REGULATOR

[75] Inventor: Juozas Doveinis, Sterling Heights, Mich.

[73] Assignee: General Motors Corporation, Detroit, Mich.

[21] Appl. No.: 744,999

[22] Filed: Nov. 26, 1976

[51] Int. Cl.² .............................................. E05F 5/12
[52] U.S. Cl. ........................................ 49/103; 49/349; 49/351
[58] Field of Search .................... 49/103, 227, 349–351

[56] References Cited
U.S. PATENT DOCUMENTS 3,659,381  5/1972  Frey et al. ............................. 49/103
3,670,454  6/1972  Gebhard et al. .................... 49/227 X Primary Examiner—Kenneth Downey
Attorney, Agent, or Firm—K. H. MacLean, Jr.

[57] ABSTRACT

A window regulator mechanism for sequentially moving a plurality of window panels between open and closed positions including a pivotal gear sector adapted to rotate first through a first range of pivotal movement, while directly controlling the operation of a small vent window and which sequentially rotates through a second range of pivotal movement to directly control the operation of a second window. Lost motion means and a latch mechanism prevent simultaneous movement of the vent and the second window.

3 Claims, 3 Drawing Figures

WINDOW REGULATOR

This invention relates to a window regulator mechanism employing a rotative member movable through two sequential pivotal ranges, the operation during the first range moving only a first vent window and operation during the second range moving only the second window.

Prior to the subject invention, there have been known several window regulator mechanisms for operating dual or plural window panels. An example of such a regulator is found in U.S. Pat. No. 2,955,817 to Campbell. This regulator provides for simultaneous movement of a two-panel window and is particularly desirable for use in a rearward door of a four-door vehicle where the storage space for the window in the closed position may be limited. Specifically, the length of the combined bottom edges of the two-panel window may be greater than the length of the door bottom.

In a forward vehicle door, it is often desirable to provide a small ventilation window or corner vent, as it is commonly called, which is separately operable with respect to a primary or viewing window. Previously, separate control mechanisms and cranks were used to control each window section. The subject invention provides a single regulator mechanism to first lower the corner vent window and then lower the primary viewing window. Sequential operation is desirable, since many times it is desirable to lower only the corner vent window for limited ventilation purposes without moving the primary window from its closed position which could cause undesirable draft.

The subject regulator mechanism is simple and compact and includes two window actuating or regulating arms, one for the corner vent window and one for the primary window. The arms are movable about a single pivot and with a direct acting connection provided between the power input for the windows and the arm. This eliminates many possibilities for misalignments and resultant binding action of the windows. A gear sector rotates through a first range of pivotal movement to cause the vent window actuator to pivot and open the vent window. This movement of the vent window actuating arm is produced by engagement of gear teeth on the end portion of the actuating arm with gear teeth on the rotative gear sector. Subsequent to the first range of pivotal movement, the gear sector moves through a second range of pivotal movement during which the gear sector is directly linked to the actuating arm for the primary window. During the second range of pivotal movement, the first actuating arm for the corner vent window does not produce any actuating movement of the corner vent window, but instead gear teeth continued along the side of the first actuating arm bodily shift the arm with respect to the vent window and generally tangential to the gear sector member. This does not affect the vertical position of the corner vent window.

During movement of the gear sector through the first pivotal range of movement, the primary window actuating arm is not affected by rotation of the gear sector. A link member between the gear sector and the actuating arm travels through a lost motion produced by movement of a pin in an elongated aperture in the end of the actuating arm. Not until the first range of pivotal movement of the gear sector is completed does the pin engage the end of the elongated opening and begin to produce pivotal movement of the actuating arm for the primary window. In addition, a pivotal latch member mounted on the end of the actuating arm of the primary window normally prevents pivotal movement of the actuating arm until completion of the first range of the pivotal movement. At the completion of the first range of pivotal movement of the gear sector, a cam surface on the latch member engages the pin and causes the latch member to rotate, freeing the actuating arm for pivotal movement during rotation of the gear sector through its second range of pivotal movement.

Therefore, an object of the invention is to provide a single regulator mechanism for plurally sectioned windows characterized by compactness and simplicity to produce sequential opening and closing of the plural sections.

A further object of the invention is to provide a regulator mechanism for dual window sections of a vehicle door to produce sequential opening and closing of the dual windows by operation of a rotative input gear sector through two sequential ranges of pivotal movement, during the first of which a vent window actuating arm is first pivoted by direct engagement between gear teeth on the end of the actuating arm and gear teeth on the gear sector and during the second pivotal range the vent window actuating arm moves axially by engagement of gear teeth along its side portion.

A still further object of the present invention is to provide a single regulator mechanism for a vehicle door having two window sections, including a lost motion connector between a gear sector input member and the primary window actuating arm to permit the gear sector to pivot through a first range of pivotal movement without producing any rotation of this actuating arm. During a second range of pivotal movement, the arm is rotated subsequent to the lost motion being completed by movement of a pin member in an elongated aperture. Engagement of the pin with the end of the elongated slot at the beginning of the second range of pivotal movement produces rotation of the actuating arm and operation of the primary viewing window.

A still further object of the present invention is to provide a single regulator mechanism for vehicle doors having dual-part windows to produce sequential opening and closing of a vent window and then a primary viewing window including a latch mechanism to prevent rotative movement of the actuator arm of the primary window prior to complete opening of the vent window. The latch has an elongated aperture through a pivotal member and into which a pin member extends to engage a cam surface on the latch member after a predetermined rotation of an input gear member to cause the latch member to move from a locked to an unlocked position, thus freeing the actuating arm for movement of the primary window.

Figure 1:
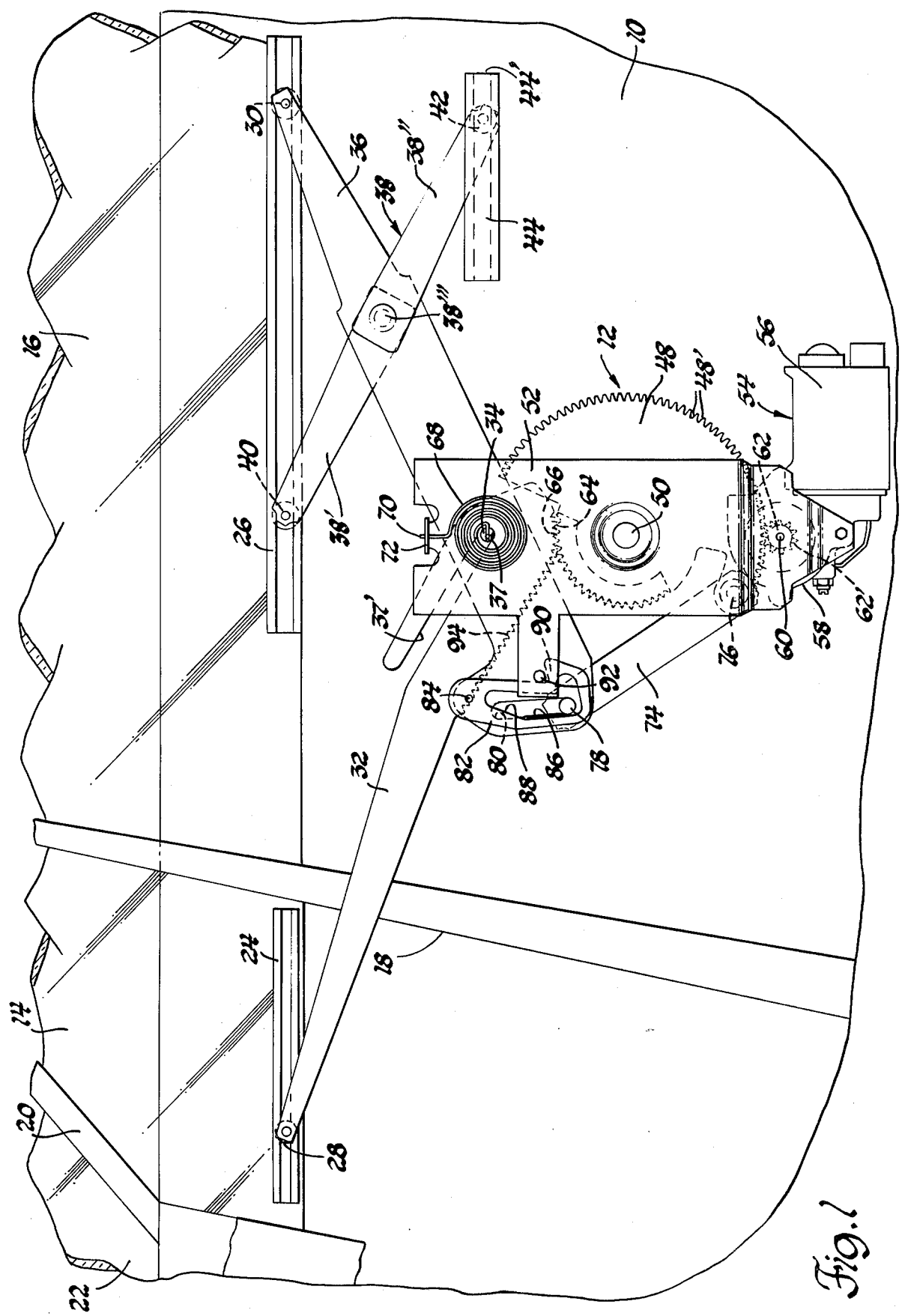
FIG. 1 is a fragmentary view of a vehicle door cut away to reveal the subject window regulator mechanism and looking outward toward the outer panel of the door with both windows in closed operative positions.

In the drawings, the outer panel 10 of a vehicle door is illustrated with the interior panel not shown but normally in overlying relation to the view. A window regulator mechanism 12 is supported between the outer panel 10 and the inner panel by the latter. The particular door illustrated includes a forwardly positioned vent window or corner vent (CV) 14 and a rearwardly located primary or viewing window 16. The CV window 14 is guided by track means 18 of conventional construction, normally U-shaped channel. Likewise, the window 16 is guided in up and down motion by similar track means. A forward door pillar member 20 separates the CV window 14 from the windshield 22 which sweeps laterally across the forward portion of the vehicle in a conventional manner. Both windows 14 and 16 have channel means 24, 26 attached to the bottom edge of the glass section to act as guides for roller guides 28, 30. The roller guide 28 is supported on the end of a first operator arm or actuator 32, while the roller 30 is mounted on the end of a second operator arm or actuator 36.

The vent window 14 is vertically moved as the arm 32 is pivoted clockwise and counterclockwise about a pivot shaft 34. The pivot shaft 34 extends through an opening or aperture 37 with an elongated continuous slot portion 37' connected therewith generally extending in an axial direction. This permits the arm 32 to initially pivot counterclockwise from the position shown in FIG. 1 to the position shown in FIG. 2. Subsequently, it moves axially to the position shown in FIG. 3. As the arm 32 is bodily shifted to the right, it is guided by the engagement of shaft 34 in the elongated slot 37' of the aperture 37 and the roller 28 moves rearwardly within the channel member 24. It should be noted, as explained hereinafter, that while arm 32 moves in a direction to the right with the roller 28 moving within channel 24, there is no resultant vertical movement of the vent window 14.

The primary window 16 is illustrated in its closed position in FIG. 1, wherein the roller 30 on arm 36 is held in channel 26. A cross arm assembly includes two arm portions 38', 38" which are connected by a shaft 38'''. Arm 38' has roller 40 on one end and located within the channel 26. The end of cross arm 38" has another roller 42 which is movable within another channel 44 affixed to the inner panel (not shown) and parallel to channel 26. As the glass 16 is moved from its fully closed position shown in FIGS. 1, 2 to the open position shown in FIG. 3, the rollers 30 and 40 initially move to the right and to the left in the channel 26 as arm 36 is pivoted clockwise about the axis formed by shaft 34. Roller 30 initially moves to the right and passes to the rear of (to the right of) the end 44' of guide channel 44 and then moves to the left again. Similarly, roller 40 initially moves to the left from the position shown in FIG. 2 and then moves rightward to the position shown in FIG. 3. Arms 38' and 38" are pivoted about shaft 38''' mounted upon a portion of window actuator arm 36 about midway between the point 34 and the roller 30. It should be noted that the arms 36, 38', 38", as well as arm 32, are of sheet metal material which is flexible in the direction normal to the plane of the drawings and the arms may be preformed so that they actually extend in a somewhat nonplanar relation. These techniques are used to avoid interference between arms as they rotate and are well known in the window activation field.

The regulator mechanism which produces the aforedescribed pivotal movement of arm 32 and arm 36 is illustrated in the views and includes a gear sector member 48 pivotal about a pivot-forming fastener 50 which may be a rivet extending through the stationary support plate 52. The support plate 52 is attached to the inner panel of the door (not shown but adapted to extend generally in overlying relation to the parts shown in the views). Gear sector 48 is selectively pivoted in a clockwise direction from the position shown in FIG. 1 to the position shown in FIG. 3 by an electric motor and transmission mechanism 54. Mechanism 54 includes a small electric motor 56 which is adapted to be energized by the vehicle battery and controlled by a door switch or switches (not shown). The transmission mechanism 58 is of relatively conventional design including worm and spur gears and shafts to transmit rotary motion of the shaft of motor 56 which is about an axis parallel to the plane of the paper to rotary motion of a shaft 60 whose axis is normal to the plane of the paper. The shaft 60 supports a gear member 62 thereon. The teeth 62' on gear member 62 engage teeth 48' on the outer periphery of gear sector 48. When the motor 56 is energized to open the windows, the gear sector 48 rotates clockwise. Likewise, when the motor energization is reversed, the windows are moved to the closed position.

Figure 2:
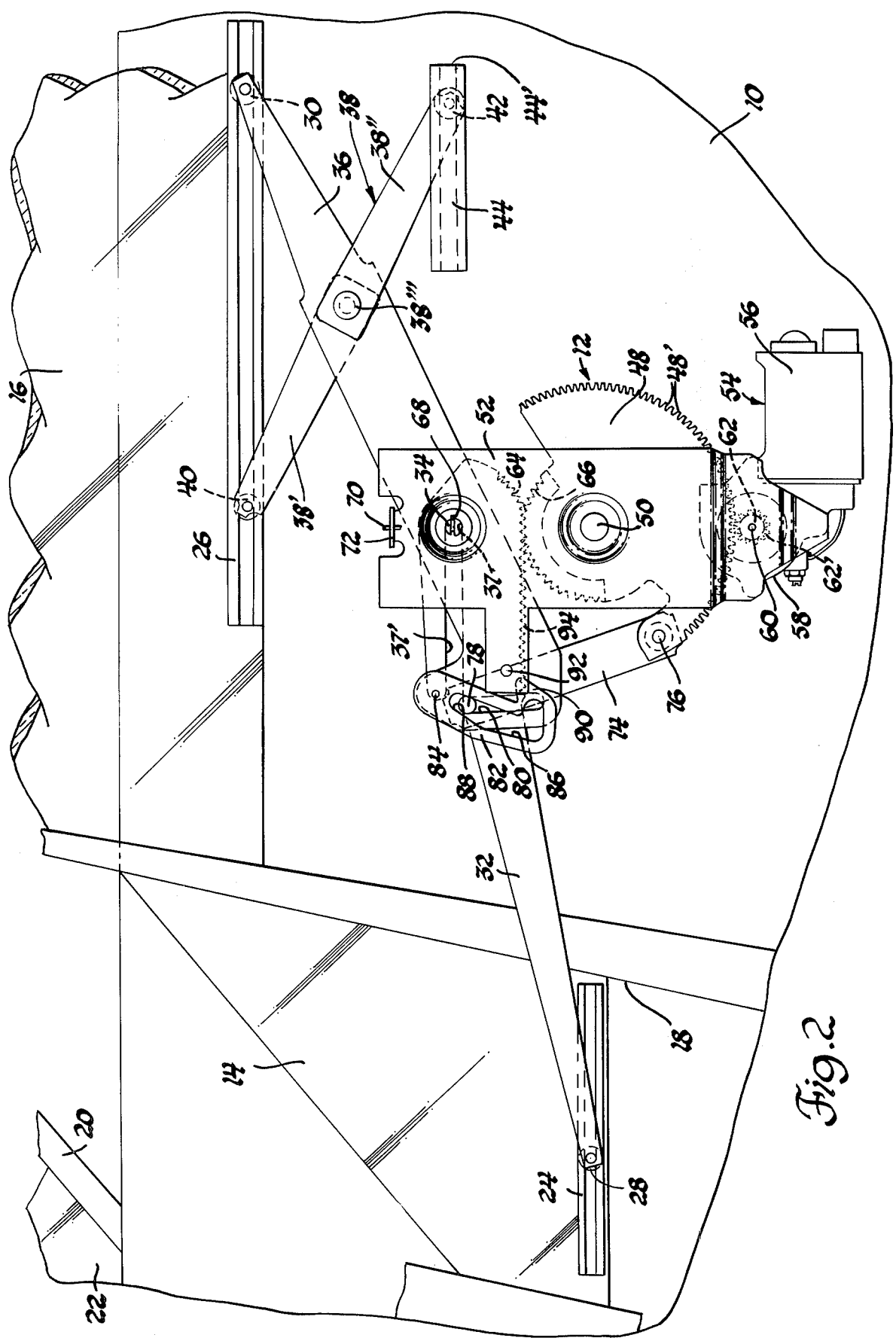
FIG. 2 is a view similar to FIG. 1 but showing the corner vent window in an open position.

Rotation of gear sector 48 clockwise from the position shown in FIG. 1 to the position shown in FIG. 2 represents a first range of rotational or pivotal movement. During this rotation, a first plurality of gear teeth 64 on the end of arm 32 and displayed in an arc about aperture 27 are engaged by similar teeth 66 on gear sector 48 to cause counterclockwise pivotal movement of arm 32 about shaft 34. This produces downward movement of the CV glass panel 14.

At the same time that arm 32 is being pivoted counterclockwise, a link arm 74 is moved generally upward from its position shown in FIG. 1 to the position shown in FIG. 2. The lower end of link arm 74 is pivotally attached by a rivetlike fastener 76 to the gear sector 48. The upper end of link arm 74 has a pin or shaft 78 extending normal therefrom. Pin 78 extends through a slot 80 formed in the end of arm 36. The slot 80 is formed on the opposite side of the pivotal support 34 than roller 30. During the aforementioned first stage of rotative movement, the pin 78 moves upward the full length of slot 80, thus not producing any pivotal movement of arm 36 due to the lost motion of pin 78 in slot 80. During this lost motion, the CV regulator arm 32 is moved from its up position shown in FIG. 1 to the down position shown in FIG. 2.

Figure 3:
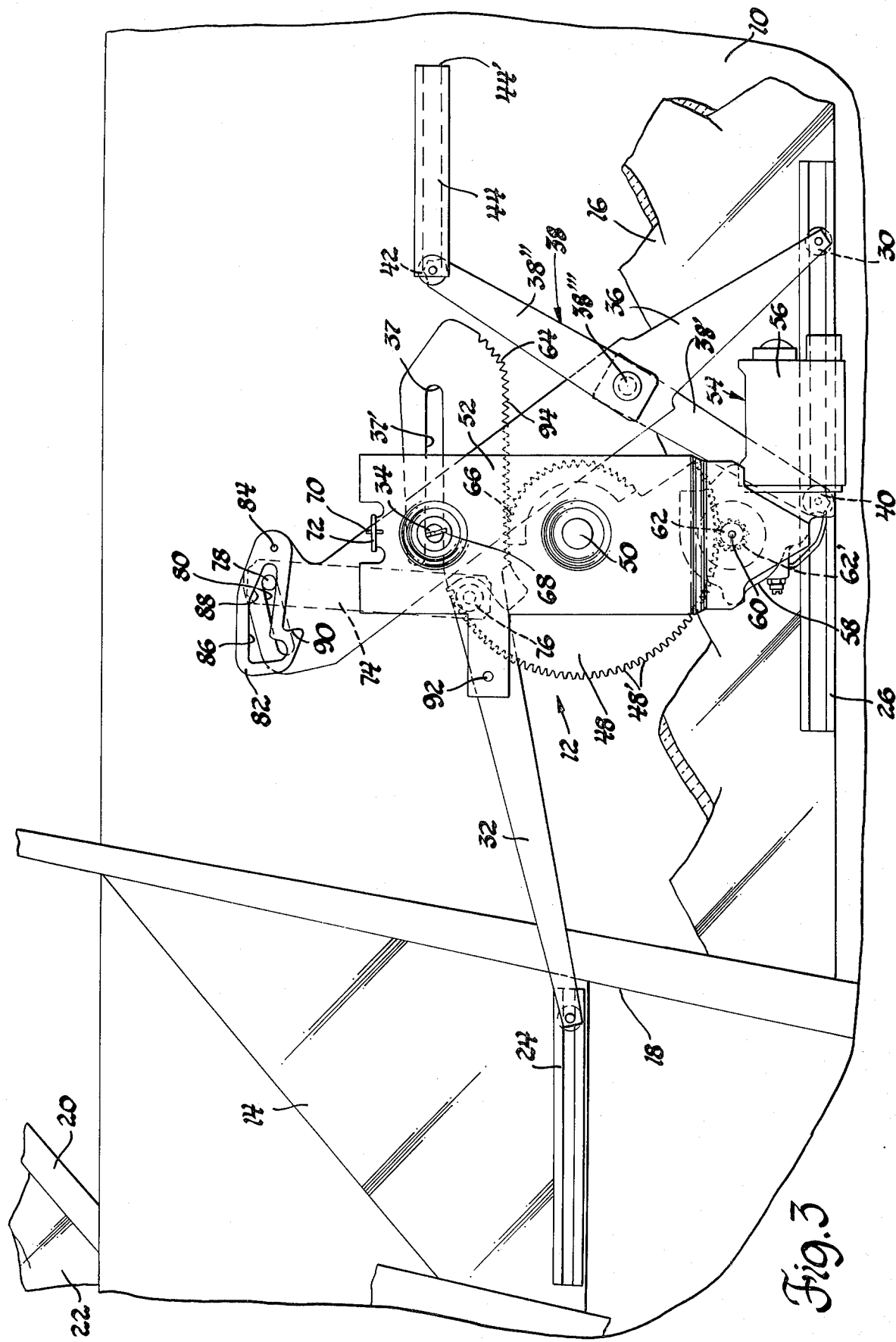
FIG. 3 is a view similar to FIG. 1 but illustrating the vent window and the primary viewing window in open positions.

As the gear sector 48 is further pivoted clockwise, as represented by a second range of rotative movement between the positions shown in FIG. 2, the pin 78 engages the upper end of slot 80 and begins pivotal clockwise movement of arm 36 from the position shown in FIGS. 1 and 2 to the position shown in FIG. 3. It should be explained that a lock-up or latch mechanism is provided on the end of shaft 34 to prevent opening movement of arm 36 until the vent window is in its fully downward position. Specifically, lockout arm 82 is pivotally attached at an upper end by a rivet fastener 84 to the end of actuating arm 36. An elongated aperture 86 through the member 82 is pierced by the pin 78. Thus, pin 78 moves within the slot 80 and aperture 86. A cam surface 88 which defines the upper part of the aperture 86 is engaged by the pin near the completion of the pin's upward movement in slot 80 to pivot the member 82 clockwise from the position shown in FIG. 1 to the position shown in FIGS. 2 and 3. This pivotal movement of member 82 moves a shoulder portion 90 away from a lockout pin 92 attached to the plate 52. When the pin 92 and shoulder 90 are in alignment, the arm 36 is not permitted to rotate clockwise from the position shown in FIG. 1. Thus, pivotal movement of member 82 misaligns the shoulder 90 with pin 92 so that the gear sector 48 may continue to be rotated through the second range of pivotal movements defined by positions shown in FIGS. 2 and 3.

During the aforedefined second range of rotative movement, the engagement of pin 78 with the upper end of slot 80 in arm 36 forces the arm 36 to rotate clockwise. This movement of arm 36 causes window 16 to move downward and generally in back of the mechanism 12 and substantially parallel to the outer panel 10. In order to smooth the opening and closing action of window 16, whose bottom edge is normally substantially longer than the CV window 14, the cross arm 38 is utilized with rollers 40, 42 guided by channels 26 and 44. The somewhat flexible sheet metal arms accommodate movement of the glass in a slight laterally outward direction as the glass is lowered. This slight outward movement of the bottom edge of glass 16 is common in modern automobiles and the exact path traced by the glass as it is moved upward and downward is controlled by channels along the forward edge portion and the rearward edge portion of the glass. These edge channels are not shown but are conventional and may take several forms. Usually a U-shaped channel is utilized.

To balance the action of the arm 36 as it moves between positions represented in FIGS. 2 and 3, a coil-type spring 68 is employed between the pivot shaft 34 which rotates with arm 36 and the stationary support plate 52. Specifically, the central end of the spring 68 is engaged by a slot in the shaft 34, while the outer end 70 of the spring 68 is fixedly attached to a projection 72 of plate 52.

During the second range of pivotal movement of gear sector 48 in which the regulator arm 36 pivots clockwise to the position shown in FIG. 3, the CV regulator arm 32 is not moved further downward. A second plurality of gear teeth 94 is provided extending in a rectilinear path parallel to slot portion 37' and along the edge or side of the arm 32 continuous with the first plurality of teeth 64 to engage gear teeth 66 of the gear sector 48. The meshing of gear teeth 66 and 94 produces bodily shifting movement of the arm 32 guided by cooperation between shaft 34 and slot 36. This results in movement generally along the axis of the arm 32. During this bodily movement of the arm 32, the roller 28 moves rightward within channel 24 of the CV window 14 as shown in FIGS. 2 and 3.

Although the embodiment illustrated in the drawings is a preferred embodiment, other modifications may be adapted which do not deviate from the basic arrangement of the subject invention and its operation, therefore, still falling within the scope of the following claims which define the invention.

What is claimed is as follows:

1. A vehicle window regulator mechanism for sequentially operating a vent panel and a window panel between open and closed positions relative to a door panel, said window regulator mechanism comprising: rotative drive means pivotally supported by the body panel for selective rotation through a first range of rotative movement and subsequently through a second range of rotative movement; a first regulator arm; means supporting the first regulator arm to permit pivotal and bodily shifting movement relative to the drive means and body panel including a slot and shaft connection therebetween whereby the shaft rotates at one end of the slot during said first range of rotative movement and the shaft slides along the slot during said second range of rotative movement; means mounting the first regulator arm for pivotal and bodily shifting movement relative to the drive means; a second regulator arm operably connected to said window panel; means operably connecting the second regulator arm for movement by the drive means only during rotation of the drive means through the second range of rotational movement of the drive means; connecting means between the drive means and the first regulator arm including gear teeth displayed in an arc about said one end of said slot to effect pivotal movement of the first regulator arm during the first range of rotative movement of the drive means to raise and lower the vent panel and including gear teeth displayed in a direction parallel to the elongated dimension of the slot to effect bodily shifting movement of the first regulator arm relative to the vent panel and drive means during the second range of rotative movement of the drive means to maintain the vent panel in the open position during operation of the window panel by the second regulator arm.

2. A vehicle window regulator mechanism for sequentially operating a vent panel and a window panel between open and closed positions relative to a vehicle body panel, said window regulator mechanism comprising: drive means pivotally supported by the body panel and including a gear sector for rotation through a first range of rotative movement, followed by a second range of rotative movement; a pivot shaft supported by the body panel; a first regulator arm having an aperture therethrough receiving the pivot shaft to mount the first regulator arm for pivotal movement about the pivot shaft; means connecting the vent panel and the first regulator arm to permit pivotal and bodily shifting movement of the first regulator arm relative to the vent panel; a slot, including and continuous with said aperture, forming a rectilinearly extending portion therefrom to permit bodily shifting movement of the first regulator arm relative to the pivot shaft; a second regulator arm connected to the window panel; lost motion means operably connecting the second regulator arm and said gear sector for movement of the arm by said drive means only during rotation of the gear sector through the second range of rotative movement; a plurality of gear teeth on the first regulator arm engaged with the gear sector, a first portion of the gear teeth being displayed in an arc about the aperture of the regulator arm so as to effect a pivotal movement of the first regulator arm about the pivot shaft during the first range of pivotal movement of the gear sector, and a second portion of the gear teeth being displayed in a rectilinear path parallel to the elongated slot portion in the regulator arm so as to effect bodily shifting movement of the regulator arm during the second range of pivotal movement of the gear sector, whereby the first regulator arm is mounted for pivotal movement to raise and lower the vent panel during the first range of gear sector rotational movement, and mounted for bodily shifting movement during the second range of gear sector movement to hold the vent panel in the open position during actuation of the window panel by the second regulator arm.

3. A vehicle window regulator mechanism for sequentially raising and lowering a vent panel and a window panel relative to a vehicle body panel, said window regulator mechanism comprising: a gear sector pivotally supported by the body panel; a pivot shaft supported by the body panel; a first regulator arm with an aperture about the pivot shaft to permit rotative movement thereabout; the aperature including a rectilinearly extending slot portion generally disposed in an axial direction with respect to the regulator arm; a channel and roller means connecting the vent panel and the first regulator arm to permit pivotal and bodily shifting movement of the regulator arm relative to the vent panel; gear teeth on the first regulator arm engaging similarly formed gear teeth on the gear sector, a first plurality of the gear teeth being disposed in an arc about the aperture to effect pivotal movement of the first regulator arm about the pivot shaft during a first range of rotative movement of the gear sector, a second plurality of gear teeth continuous with the first gear teeth and being disposed in a rectilinear path along the side of the regulator arm parallel to the rectilinear slot to effect bodily shifting movement of the regulator arm during a second range of rotative movement of the gear sector; a second regulator arm connected to the window panel at one end and to said pivotal shaft at a mid-portion; lost motion means including an elongated slot and a pin extending therethrough operably connecting the gear sector and a second end of the second regulator arm permitting the gear sector to rotate through the first range of rotative movement while the pin moves from one end of the elongated slot to the other end and subsequently to cause the second regulator arm to be pivoted during rotation of the gear sector through its second range of rotative movement produced by engagement of the pin with the end surface of the elongated slot.

* * * * *